US012659911B2

(12) United States Patent
Hekkala et al.

(10) Patent No.: US 12,659,911 B2
(45) Date of Patent: Jun. 16, 2026

(54) NON-STATIONARY CARRIER-PHASED POSITIONING

(71) Applicant: NOKIA TECHNOLOGIES OY, Espoo (FI)

(72) Inventors: Aki Hekkala, Oulu (FI); Hyun-Su Cha, Chicago, IL (US); Dileep Kumar, Espoo (FI); Satya Krishna Joshi, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 282 days.

(21) Appl. No.: 18/374,551

(22) Filed: Sep. 28, 2023

(65) Prior Publication Data

US 2025/0113325 A1     Apr. 3, 2025

(51) Int. Cl.
*H04L 5/00* (2006.01)
*H04W 64/00* (2009.01)
(52) U.S. Cl.
CPC ........... *H04W 64/00* (2013.01); *H04L 5/0051* (2013.01)
(58) Field of Classification Search
None
See application file for complete search history.

(56) References Cited

U.S. PATENT DOCUMENTS

2024/0430838 A1 * 12/2024 Duan ................ H04W 56/0055
2025/0039718 A1 * 1/2025 Manolakos ........... H04W 24/10
2025/0056468 A1 * 2/2025 Saha ................ H04W 56/0035
2025/0067876 A1 * 2/2025 Peng ...................... G01S 19/13

OTHER PUBLICATIONS

3GPP TSG RAN Meeting #98-e, Electronic Meeting, Dec. 12-16, 2022, RP-223549, Intel Corporation, CATT, Ericsson, "New WID on Expanded and Improved NR Positioning", 7 pages.
3GPP TSG RAN WG1 #114, Toulouse, France, Aug. 21-Aug. 25, 2023, R1-2306819, Nokia, Nokia Shanghai Bell, "Views on NR DL and UL Carrier Phase Positioning", 11 pages.
3GPP TSG RAN WG1 Meeting #114, Toulouse, France, Aug. 21-Aug. 25, 2023, R1-2308484, Rapporteur, "RAN1 Agreements for Rel-18 WI on Expanded and Improved NR Positioning", 52 pages.
3GPP TSG RAN WG1 #114, Toulouse, France, Aug. 21-Aug. 25, 2023, "RAN1 Chair's Notes", 194 pages.

* cited by examiner

*Primary Examiner* — Idowu O Osifade
(74) *Attorney, Agent, or Firm* — Carter, DeLuca & Farrell LLP

(57) ABSTRACT

Systems, methods, apparatuses, and computer program products for non-stationary carrier-phased positioning (CPP). A method may include receiving an indication to transmit a sounding reference signal or a carrier phase positioning measurement. The indication may include at least a phase pre-compensation on the sounding reference signal transmission or a correction of the carrier phase positioning measurement based at least on a Doppler shift. The method may also include performing, at a user equipment, the phase pre-compensation for the sounding reference signal transmission, or the correction of the carrier phase positioning measurement. The method may further include transmitting, by the user equipment, the sounding reference signal with the phase pre-compensation or the carrier phase positioning measurement.

1 Claim, 12 Drawing Sheets

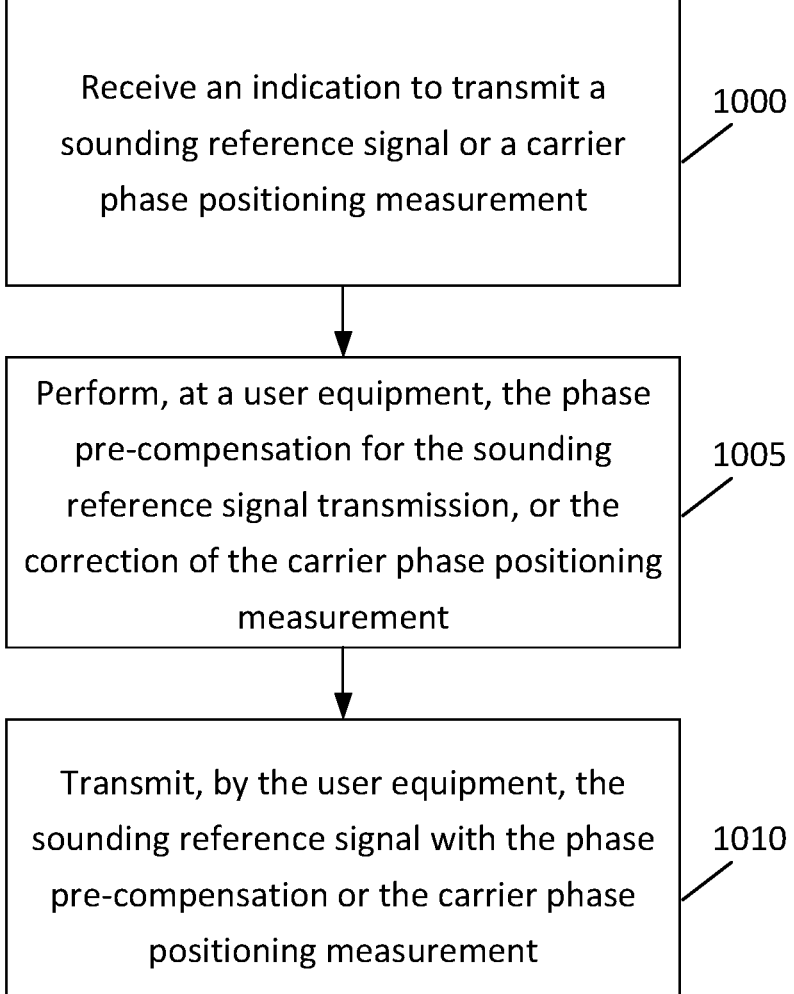

Receive an indication to transmit a sounding reference signal or a carrier phase positioning measurement — 1000

Perform, at a user equipment, the phase pre-compensation for the sounding reference signal transmission, or the correction of the carrier phase positioning measurement — 1005

Transmit, by the user equipment, the sounding reference signal with the phase pre-compensation or the carrier phase positioning measurement — 1010

FIG. 10

Receive an indication that a network element is activated for carrier phase positioning    1100

Receive, upon activation of the network element, a sounding reference signal from a user equipment    1105

Transmit a measurement report comprising a carrier phase measurement to a network element    1110

NON-STATIONARY CARRIER-PHASED POSITIONING

FIELD

Some example embodiments may generally relate to mobile or wireless telecommunication systems, such as Long Term Evolution (LTE) or fifth generation (5G) new radio (NR) access technology, or 5G beyond, or sixth generation (6G) access technology, or other communications systems. For example, certain example embodiments may relate to apparatuses, systems, and/or methods for non-stationary carrier-phased positioning (CPP).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, fifth generation (5G) radio access technology or new radio (NR) access technology and/or sixth generation (6G) radio access technology. Fifth generation (5G) and sixth generation (6G) wireless systems refer to the next generation (NG) of radio systems and network architecture. 5G and 6G network technology is mostly based on new radio (NR) technology, but the 5G/6G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include receiving an indication to transmit a sounding reference signal or a carrier phase positioning measurement. The indication may include at least a phase pre-compensation on the sounding reference signal transmission or a correction of the carrier phase positioning measurement based at least on a Doppler shift. The method may also include performing, at a user equipment, the phase pre-compensation for the sounding reference signal transmission, or the correction of the carrier phase positioning measurement. The method may further include transmitting, by the user equipment, the sounding reference signal with the phase pre-compensation or the carrier phase positioning measurement.

Other example embodiments may be directed to an apparatus. The apparatus may include at least one processor and at least one memory storing instructions. The instructions, when executed by the at least one processor, cause the apparatus at least to receive an indication to transmit a sounding reference signal or a carrier phase positioning measurement. The indication may include at least a phase pre-compensation on the sounding reference signal transmission or a correction of the carrier phase positioning measurement based at least on a Doppler shift. The apparatus may also be caused to perform the phase pre-compensation for the sounding reference signal transmission, or the correction of the carrier phase positioning measurement. The apparatus may further be caused to transmit the sounding reference signal with the phase pre-compensation or the carrier phase positioning measurement.

Other example embodiments may be directed to an apparatus. The apparatus may include means for receiving an indication to transmit a sounding reference signal or a carrier phase positioning measurement. The indication may include at least a phase pre-compensation on the sounding reference signal transmission or a correction of the carrier phase positioning measurement based at least on a Doppler shift. The apparatus may also include means for performing the phase pre-compensation for the sounding reference signal transmission, or the correction of the carrier phase positioning measurement. The apparatus may further include means for transmitting the sounding reference signal with the phase pre-compensation or the carrier phase positioning measurement.

In accordance with other example embodiments, a non-transitory computer readable medium may be encoded with instructions that may, when executed in hardware, perform a method. The method may include receiving an indication to transmit a sounding reference signal or a carrier phase positioning measurement. The indication may include at least a phase pre-compensation on the sounding reference signal transmission or a correction of the carrier phase positioning measurement based at least on a Doppler shift. The method may also include performing, at a user equipment, the phase pre-compensation for the sounding reference signal transmission, or the correction of the carrier phase positioning measurement. The method may further include transmitting, by the user equipment, the sounding reference signal with the phase pre-compensation or the carrier phase positioning measurement.

Other example embodiments may be directed to a computer program product that performs a method. The method may include receiving an indication to transmit a sounding reference signal or a carrier phase positioning measurement. The indication may include at least a phase pre-compensation on the sounding reference signal transmission or a correction of the carrier phase positioning measurement based at least on a Doppler shift. The method may also include performing, at a user equipment, the phase pre-compensation for the sounding reference signal transmission, or the correction of the carrier phase positioning measurement. The method may further include transmitting, by the user equipment, the sounding reference signal with the phase pre-compensation or the carrier phase positioning measurement.

Other example embodiments may be directed to an apparatus that may include circuitry configured to receive an indication to transmit a sounding reference signal or a carrier phase positioning measurement. The indication may include at least a phase pre-compensation on the sounding reference signal transmission or a correction of the carrier phase positioning measurement based at least on a Doppler shift. The apparatus may also include circuitry configured to perform the phase pre-compensation for the sounding reference signal transmission, or the correction of the carrier phase positioning measurement. The apparatus may further include circuitry configured to transmit the sounding reference signal with the phase pre-compensation or the carrier phase positioning measurement.

Some example embodiments may be directed to a method. The method may include receiving an indication that a network element is activated for carrier phase positioning. The method may also include receiving, upon activation of the network element, a sounding reference signal from a user equipment. The method may further include transmitting a measurement report comprising a carrier phase measurement to a network element.

Other example embodiments may be directed to an apparatus. The apparatus may include at least one processor and at least one memory storing instructions. The instructions, when executed by the at least one processor, cause the apparatus at least to receive an indication that a network element is activated for carrier phase positioning. The apparatus may also be caused to receive, upon activation of the network element, a sounding reference signal from a user equipment. The apparatus may further be caused to transmit a measurement report comprising a carrier phase measurement to a network element.

Other example embodiments may be directed to an apparatus. The apparatus may include means for receiving an indication that a network element is activated for carrier phase positioning. The apparatus may also include means for receiving, upon activation of the network element, a sounding reference signal from a user equipment. The apparatus may further include means for transmitting a measurement report comprising a carrier phase measurement to a network element.

In accordance with other example embodiments, a non-transitory computer readable medium may be encoded with instructions that may, when executed in hardware, perform a method. The method may include receiving an indication that a network element is activated for carrier phase positioning. The method may also include receiving, upon activation of the network element, a sounding reference signal from a user equipment. The method may further include transmitting a measurement report comprising a carrier phase measurement to a network element.

Other example embodiments may be directed to a computer program product that performs a method. The method may include receiving an indication that a network element is activated for carrier phase positioning. The method may also include receiving, upon activation of the network element, a sounding reference signal from a user equipment. The method may further include transmitting a measurement report comprising a carrier phase measurement to a network element.

Other example embodiments may be directed to an apparatus that may include circuitry configured to receive an indication that a network element is activated for carrier phase positioning. The apparatus may also include circuitry configured to receive, upon activation of the network element, a sounding reference signal from a user equipment. The apparatus may further include circuitry configured to transmit a measurement report comprising a carrier phase measurement to a network element.

Some example embodiments may be directed to a method. The method may include receiving user equipment data from a user equipment. The method may also include receiving a plurality of measurement reports of carrier phase measurements from a plurality of network elements or a user equipment. The method may further include correcting the carrier phase measurements obtained from a sounding reference signal. In addition, the method may include determining a position of the user equipment based on the corrected carrier phase measurements.

Other example embodiments may be directed to an apparatus. The apparatus may include at least one processor and at least one memory storing instructions. The instructions, when executed by the at least one processor, cause the apparatus at least to receive user equipment data from a user equipment. The apparatus may also be caused to receive a plurality of measurement reports of carrier phase measurements from a plurality of network elements or a user equipment. The apparatus may further be caused to correct the carrier phase measurements obtained from a sounding reference signal. In addition, the apparatus may be caused to determine a position of the user equipment based on the corrected carrier phase measurements.

Other example embodiments may be directed to an apparatus. The apparatus may include means for receiving user equipment data from a user equipment. The apparatus may also include means for receiving a plurality of measurement reports of carrier phase measurements from a plurality of network elements or a user equipment. The apparatus may further include means for correcting the carrier phase measurements obtained from a sounding reference signal. In addition, the apparatus may include means for determining a position of the user equipment based on the corrected carrier phase measurements.

In accordance with other example embodiments, a non-transitory computer readable medium may be encoded with instructions that may, when executed in hardware, perform a method. The method may include receiving user equipment data from a user equipment. The method may also include receiving a plurality of measurement reports of carrier phase measurements from a plurality of network elements or a user equipment. The method may further include correcting the carrier phase measurements obtained from a sounding reference signal. In addition, the method may include determining a position of the user equipment based on the corrected carrier phase measurements.

Other example embodiments may be directed to a computer program product that performs a method. The method may include receiving user equipment data from a user equipment. The method may also include receiving a plurality of measurement reports of carrier phase measurements from a plurality of network elements or a user equipment. The method may further include correcting the carrier phase measurements obtained from a sounding reference signal. In addition, the method may include determining a position of the user equipment based on the corrected carrier phase measurements.

Other example embodiments may be directed to an apparatus that may include circuitry configured to receive user equipment data from a user equipment. The apparatus may also include circuitry configured to receive a plurality of measurement reports of carrier phase measurements from a plurality of network elements or a user equipment. The apparatus may further include circuitry configured to correct the carrier phase measurements obtained from a sounding reference signal. In addition, the apparatus may include circuitry configured to determine a position of the user equipment based on the corrected carrier phase measurements.

BRIEF DESCRIPTION OF THE DRAWINGS

For proper understanding of example embodiments, reference should be made to the accompanying drawings, wherein:

FIG. 10 illustrates an example flow diagram of a method, according to certain example embodiments.

DETAILED DESCRIPTION

Figure 1:
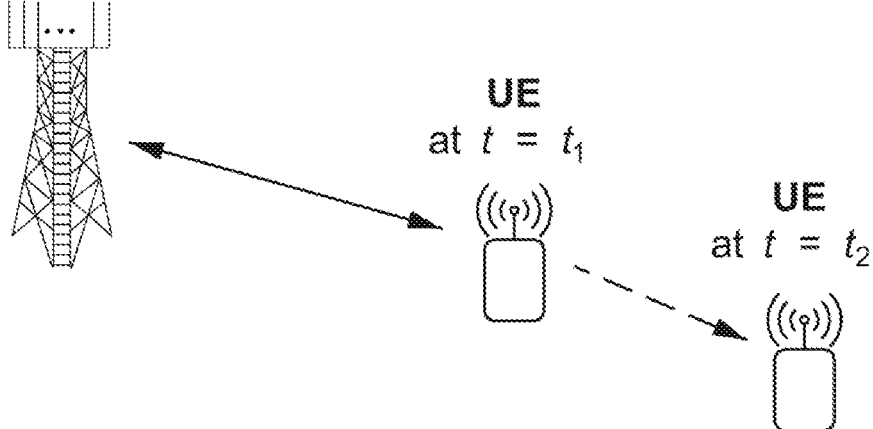
FIG. 1 illustrates an example communication between a base station (BS) and a user equipment (UE) at different time instances.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for non-stationary carrier-phased positioning (CPP).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "TRP", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements. Further, although certain example embodiments described herein may be applicable from a transmission reception point (TRP) or gNB perspective (e.g., "network based"), the same concept may also be applicable for user equipment (UE)-based or UE-assisted positioning methods. Additionally, all the mechanisms described herein may be extended to, for example, device-to-device (D2D) and sidelink (SL) communication scenarios. As also described herein, sounding reference signal (SRS) for positioning (transmitted by the UE) may be used. Further, although the signal diagrams presented and described herein relate to the uplink (UL) direction, the same may be applicable for the downlink (DL) direction as well.

In certain example embodiments, a carrier phase measurement may be at least RSCP (Reference Signal Carrier Phase) or RSCPD (Reference Signal Carrier Phase Difference) defined in 3GPP TS 38.215. Also, sounding reference signal (SRS) mentioned in herein may at least include an SRS for MIMO (Multiple Input Multiple Output) and an SRS for positioning. The SRS for MIMO may be used for the channel state information acquisition or beam management, and the SRS for positioning may be a dedicated uplink reference signal to be used for the location estimation. In some example embodiments, the UE may perform the RSCP or RSCPD measurements using downlink positioning reference signals (PRS). The PRS may be provided by a location management function (LMF). The LMF may provide the PRS in a part of positioning assistance data, which may be broadcasted in a system information.

UEs may carry out a CPP technique with an assumption of UL-based carrier phase (CP). Generally, in the CPP technique, a target UE may transmit UL reference signals (RSS), and multiple TRPs may measure phase measurements of the signal, which may be used to estimate the location of the target UE. For a transmitted SRS resource from the k-th UE, the phase measurement at the i-th TRP may be denoted by:

$$\varphi_{ik} = d_{ik} + c(\delta_k - \delta_i) + \lambda N_{ik} \tag{1}$$

In equation (1), $$\varphi_{ik} = \frac{1}{2\pi}\hat{\varphi}_{ik}$$

denotes the phase measurement in cycles and omits repeated use of $2\pi$ and $d_{ik}$, c, $\delta_k$, $\delta_i$, and $N_{ik}$ respectively represent an actual geographical distance between the k-th UE and the i-th TRP, the speed of light, an internal clock bias at the k-th UE, an internal clock bias at the i-th TRP, and an integer ambiguity of the propagated wavelength. The phase measurement may be called as RSCP (Reference Signal Carrier Phase) defined in 3GPP TS 38.215. Similar to equation (1), the same equation may be derived for the j-th TRP such that $\varphi_{jk}=d_{jk}+c$ $(\delta_k-\delta_j)+\lambda N_{jk}$, and the difference measurement between two TRPs may be described as follows:

$$\Delta\varphi_{ij}^k = \Delta d_k + c\Delta\delta_{ij} + \Delta N_{ij}^k \lambda \tag{2}$$

In equation (2), $$\Delta\varphi_{ij}^k = \varphi_{ik} - \varphi_{jk}, \Delta d_k = d_{ik} - d_{jk}, \Delta\delta_{ij} = \delta_i - \delta_j,$$

and $$\Delta N_{ij}^k = N_i - N_j.$$

7

The $$\Delta \varphi_{ij}^k$$

is a single differential measurement, which is also called as RSCPD (Reference Signal Carrier Phase Difference) defined in TS 38.215.

From the single differential operation of equation (2), the UE clock bias is cancelled, which is similar to a relative time of arrival (RTOA) measurement of uplink-time difference of arrival (UL-TDOA). The clock error between TRPs remains but is cancelled by the double differential operation using measurements from a reference device. It may be assumed that the k-th UE is a positioning reference unit (PRU). For the transmitted SRS from the PRU, the single difference measurement between the i-th TRP and j-th TRP is $$\Delta \varphi_{ij}^K = \Delta d_K \times \frac{1}{\lambda} + f\Delta\delta_{ij} + \Delta N_{ij}^K,$$

which may be further elaborated as follows:

$$\Delta\Delta\varphi_{ij}^{kK} = \Delta\Delta d_{kK} + \Delta\Delta N_{ij}^{kK}\lambda \qquad (3)$$

In equation (3), $$\Delta\Delta\varphi_{ij}^{kK} = \Delta\varphi_{ij}^k - \Delta\varphi_{ij}^K, \Delta\Delta d_{k,K} = \Delta d_k - \Delta d_K, \text{ and } \Delta\Delta N_{ij}^{kK} = \Delta N_{ij}^k - \Delta N_{ij}^K.$$

In the end, the clock error between TRPs is cancelled out, and the clock bias may be considered at the UE and the TRP, which represent the main errors to explain a single difference and a double difference method of the CP method.

In some instances, a network (e.g., LMF) may request UEs or TRPs to perform CP measurement within a specific window. Additionally, the mobility of the UE may be considered by the window configuration, and may be effective to obtain CP measurements from the target UE and PRU at the same/similar time. However, this type of solution may be limited to scenarios where the UE movement is very slow compared to the window size in the time-domain (i.e., UE is quasi-stationary).

FIG. 1 illustrates an example communication between a base station (BS) 100 and UE 105 at different time instances. As illustrated in FIG. 1, positioning of the UE 105 may provide information on the location of the UE 105 at a particular instance in time such as, for example, at time moment $t_1$. The location of the UE 105 may be available for a user, the network, or any other entity that requests this information at a time moment $t_2 > t_1$. If the UE 105 moves, it is no longer at time moment $t_2$ in the location of time moment $t_1$, within the measurement system accuracy (e.g., system accuracy limit such as, for example, a combined error limit of $\pm\Delta$, where it may be used to determine if the UE has actually moved or the reported different time moments is an error). While CPP is a method that does not request significant network resources which results in quick and accurate positioning, there still remains the problem of movement compared to a processing delay. For instance, obtaining information under the condition of the UE 105 movement is dependent on whether the system (e.g., LMF or any other similar positioning apparatus) knows to operate under the condition of the movement, regardless of the direction or the speed of the movement. Thus, in view of such drawbacks, certain example embodiments may teach the system (e.g., the receiver) to properly read the measured signal (e.g., carrier phase measured by either UE or TRP), and how to operate post-processing procedures to make the necessary corrections to obtain adequate location information of the UE 105 regardless of the direction or speed of the UE's 105 movement.

Figure 2:
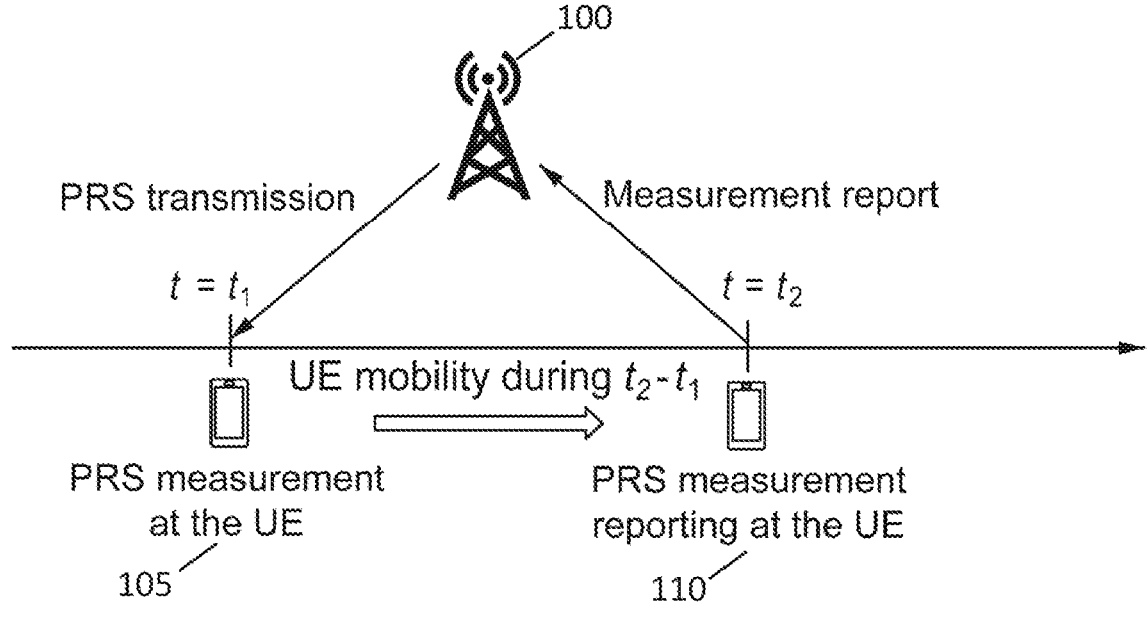
FIG. 2 illustrates another example of communications between the BS and the UE.

FIG. 2 illustrates an another example of communications between the BS 100 and the UE 105. In particular, FIG. 2 illustrates a downlink positioning reference signal (DL-PRS) transmission and a measurement between the gNB 100 and the UE 105. The UE 105 may perform a CP measurement at $t=t_1$ and report the CP measurement at $t=t_2$, according to the configuration. The CP positioning may be targeting a cm-level of accuracy so that mobility of the UE 105 during $t_2$-$t_1$ could be contrary to positioning accuracy.

Although certain example embodiments described herein may be directed to the UE, other example embodiments may cover the scope of moving TRPs. For example, a flying unmanned aerial vehicle (UAV) may be used as a TRP. Similarly, non-terrestrial networks may include satellites and high altitude platform stations (HAPS) where all but geostationary satellites move with regards to the ground station.

In certain example embodiments, the TRPs may measure the SRS for positioning reference signals transmitted by the UE. The for the best accuracy, the TRPs may measure SRS transmitted for every TRP involved in the positioning process at the same time (co-efficient for the non-stationary UE), and with the same TX chain (co-efficient for each and every UE), but not necessarily the same frequencies. Due to movement of the UE, a physical phenomenon known as Doppler shift (DS) may change the frequency of the received signals. For instance, in some example embodiments, for a stationary UE, the DS is zero; however, for a non-stationary UE, it is a coefficient that is not yet considered in the mobility of the positioning.

According to certain example embodiments, the receiver of the TRP may know how to correct the DS. However, depending on the implementation, SRS may not be corrected in the same signal processing chain as a physical uplink shared channel (PUSCH)/physical uplink control channel (PUCCH). Additionally, an implementation of, for example, PUSCH may use a method that is not applicable to SRS and, thus, the resultant error should be separately corrected. In some example embodiments, a number of options may be provided for correcting the error. For instance, one option may include correcting the error to the physical signal, and measuring the phase information after the correction. Another option may include measuring the received physical signal, and performing the correction by mathematical manipulation in signal processing.

Certain example embodiments described herein may provide various examples for the DL-based positioning, while also providing options for UL-based positioning. For DL-based positioning, the LMF may request the UE to perform CP measurements on a specific DL PRS, and compensate for the obtained measurement while taking into consideration the UE's mobility between the measurement timing ($t=t_1$) and the report timing ($t=t_2$). For example, when a CP measurement is denoted by $\phi$ obtained by the UE at ($t=t_1$), the UE may report $\phi+\Delta\phi$ rather than $\phi$ considering the mobility in the time duration between $t_2$-$t_1$. In other example embodiments, the UE may report a CP measurement (e.g., φ+Δφ) and inform the LMF that the CP measurement has been compensated considering the UE mobility between the measurement timing and reporting timing. The measurement timing may be a single measurement instance or multiple measurement instances. For example, the UE may perform the carrier phase measurement four times and average over the obtained CP measurements. The UE may decide one of the measurement instances to determine the measurement timing (t=t₁).

According to certain example embodiments, the respective RS from the network to the UE may be PRS, and if the UE's capability allows, the UE may perform the same post-processing as the network. Additionally, when needed, three TRPs may be used to illustrate certain example embodiments, while any other higher number of TRPs may be used, as well. The higher the number of TRPs, the greater the accuracy of the location calculation.

Figure 3:
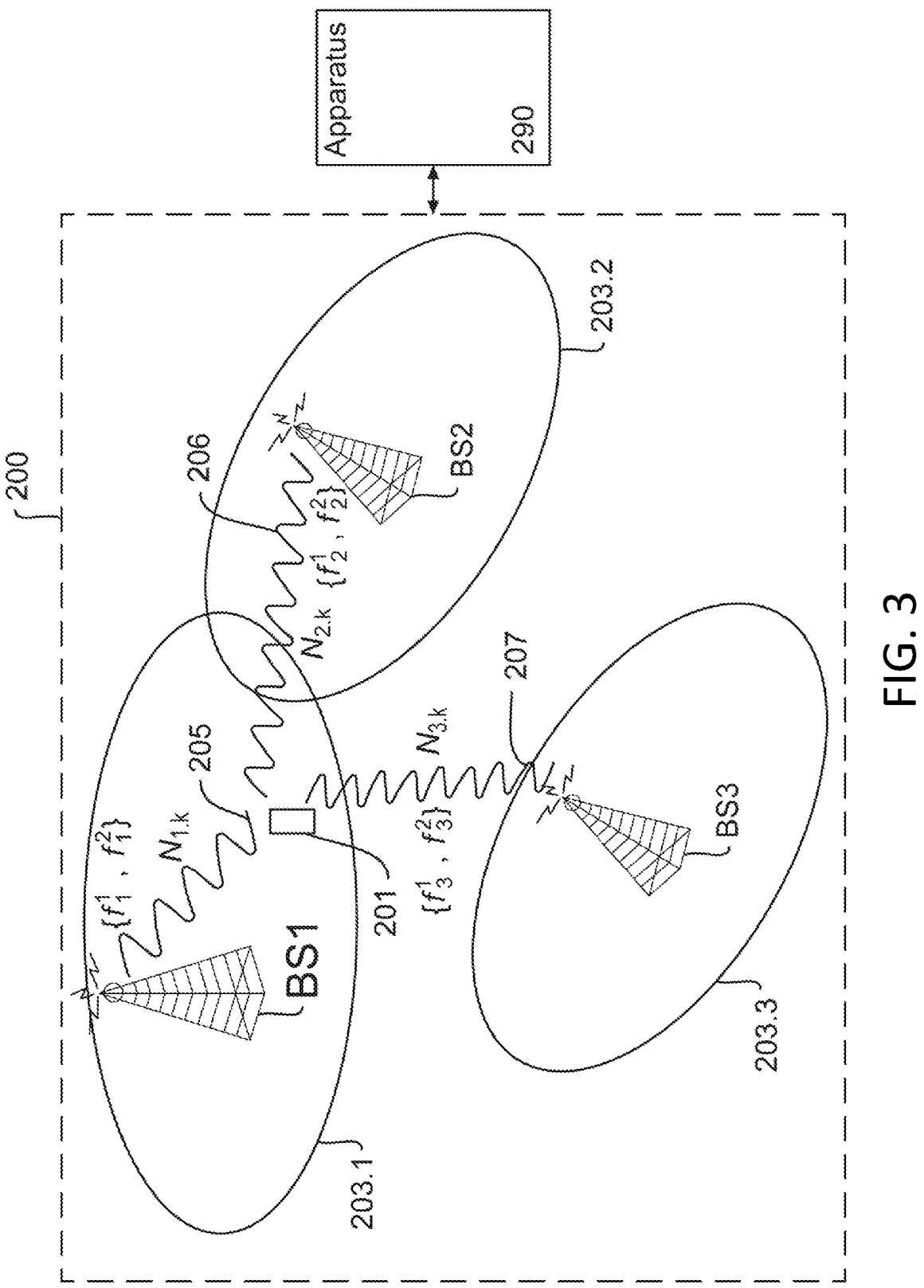
FIG. 3 illustrates an example positioning procedure.

FIG. 3 illustrates an example positioning procedure. Although the example of FIG. 3 implements 3 TRPs, the generalization to a higher number of TRPs may function the same way. Additionally, the frequency duplets $$\{f_i^1, f_i^2\}$$

present a virtual wavelength method, which may be one possible method to apply CPP. As illustrated in FIG. 3, the number of wavelengths is indicated by $N_{ik}$ where the index k refers to k-th UE. The apparatus 290 refers to an LMF, and the virtual wavelength method is developed to facilitate the calculation of the number of wavelengths propagated over the air from UE to TRP, which is not known by the signal itself. Appropriately selecting the frequency duplets $$\{f_i^1, f_i^2\}$$

may prevent the transmitted signals from interfering with each other (or any other signal present at the same time). Additionally, from a positioning point of view, the integer ambiguity search space per TRP may reduce to a significantly smaller one. If applied auxiliary measurements or a priori known information (e.g., a rough position estimation from a time-domain based positioning method) is available, the search space may be reduced to the extent that $N_{i,k}$ is known. Then it remains to measure the fractional part of the last non-completed cycle of the propagating signal.

As illustrated in FIG. 3, if the UE 201 moves, the conventional method becomes less accurate, depending on the speed of the movement of the UE 201. For instance, a speed of 3 km/h is slow compared to the processing delays by any party in the network, and may also be considered slow when considering the DS. In other words, the slow movement makes the use of more complex system processing unnecessary, while the system has an intrinsic error margin. However, the error may be present as soon as the UE starts to move. For instance, when the UE starts to move, the DS is small, and there is no problem within the system accuracy. However, in the absolute scale, the error is present no matter how significant it is to the system total accuracy.

In CPP, it may be desirable to achieve centimeter-level accuracy. With reference to FIG. 2, the error may be identified as an error in the measurement (e.g., error in the CP measurement) because of the UE's mobility, the error may be between the measurements by different TRPs, or the error may be the time-difference between the measurements and reporting.

Certain example embodiments may identify the error in the measurement due to the UE's mobility. In the case of the error being between the measurements by different TRPs, the delay from the measurements until the UE position may be reported. This type of error may occur when the network fails to perform the measurements at multiple TRPs at the same time (e.g., in the case of UL, whereas in the case of DL, the network would fail to indicate the same transmission time). In the case of the error being the time-difference between the measurements and reporting, a user (e.g., human or machine-type user) may desire to know the instantaneous location of the UE. In this type of error, the delay between the measurements and reporting presents an error, and in an application, this error may be significant. This type of error may be reported to the user, and the error may be compensated, for example, by global navigation satellite system (GNSS) clocks and making use of previous locations of the UE. In doing so, it may be possible to predict the UE's next position in time. In other words, if two subsequent locations in time are known, the system (e.g., LMF) may apply the prediction based on these two locations. The system may also use the information from the current location DS to estimate if the velocity of the UE is changing, which then may lead to different travelling distance of the UE from the last measured location of the UE.

In certain example embodiments, where the speeds of the transmitter (e.g., UE) and the receiver (e.g., TRP) relative to the medium are lower than the speed of waves in the medium, the relationship between observed frequency f and emitted frequency $f_0$ is given by:

$$f = \left(\frac{c \pm v_r}{c \pm v_s}\right) f_0,$$

where c is the propagation speed of waves in the medium, $v_s$ is the speed of UE relative to the medium added to c if the UE is moving towards the TRP or subtracted if the UE is moving away from the TRP, and $v_r$ is the speed of the TRP. However, since the TRP usually does not move, the speed of the TRP can be neglected. Further, the medium may refer to air. The electromagnetic properties of air are close to the vacuum that air may be equated to vacuum. The space between the transmitter and the receiver may also be non-air (non-vacuum) and, thus, the electromagnetic properties of that medium may change the speed of the waves.

According to certain example embodiments, it may be assumed that the system (e.g., the receiver) may transform the received signal from the time-domain to the frequency-domain before the phase measurement of the RF signals (e.g., the duplets in FIG. 3). Therefore, the DS presented in frequency-domain is seen, according to a table of Fourier transform pairs in the time-domain as $$F(\omega - \omega_0) \Leftrightarrow f(t)e^{j\omega_0 t},$$

which means a phase shift. For accurate phase measurement in CPP, this phase shift may be removed. According to certain example embodiments, if the system was not transforming the signal to frequency-domain before the measurement, the error is physically there, and the error should be removed by similar operations. For instance, there may be multiple ways to remove the error.

In certain example embodiments, the phase shift may be removed from the received signal via frequency offset correction (FOC); the offset referring to the DS. One way to remove the phase shift is to apply, in an NR signal, a pilot in the slot to "sniff" the channel; a common reference signal used is a de-modulation reference signal (DMRS). Depending on the channel (e.g., over-the-air conditions), the location/locations of DMRS symbol/symbols may be varied. For a slow movement and well-conditioned channel, a front-loaded slot structure may be used; DMRS symbol may be one of the first symbols where the exact slot location may depend on the used mapping type. If a higher speed is applied, more DMRS symbols may be inserted over the slot locations. Furthermore, any reference signal may be used to "sniff" the channel, thus, to calculate the DS.

A factor in the DS estimation may be the time period over which the calculation is performed. In NR, to smoothen the algorithm response (e.g., to avoid overshooting), the calculation may be performed by averaging multiple reference signal samples. However, it may be possible that even a single reference symbol may be enough to detect the amount of needed frequency correction. Certain example embodiments may take the capability of TRP/UE to detect the received signal's frequency offset (e.g., the DS), as an existing capability, and re-use it.

The DS may be per TRP. The movement of UE is a 3D problem, and the projection of the movement may vary TRP by TRP. For instance, it might be that the first TRP sees the UE approaching towards it, the second TRP sees the movement so that the UE moves in a 30° angle to the straight line between the UE and the TRP (then, physically, the TRP senses the projection of the UE movement to the straight line between them), and the third TRP has another angle. Thus, the movements are unique to every TRP. Even the sign of the value in the DS may change, depending on whether the UE moves towards the TRP or away from the TRP. Furthermore, to simplify the network signaling and the calculation effort, some of the TRP directions might be excluded from the DS estimation, especially if the TRP directions are negligible to the accuracy of the total system. The DS is dependent on the angle between the movement and the projection line (straight line between), and when this angle approaches 90°, the DS is no longer present.

There may be multiple ways of arranging the positioning measurement under the condition of a non-stationary UE. However, for simplicity, the UL direction is described herein, even though the DL PRS perspective may also be applicable in other example embodiments.

Figure 4:
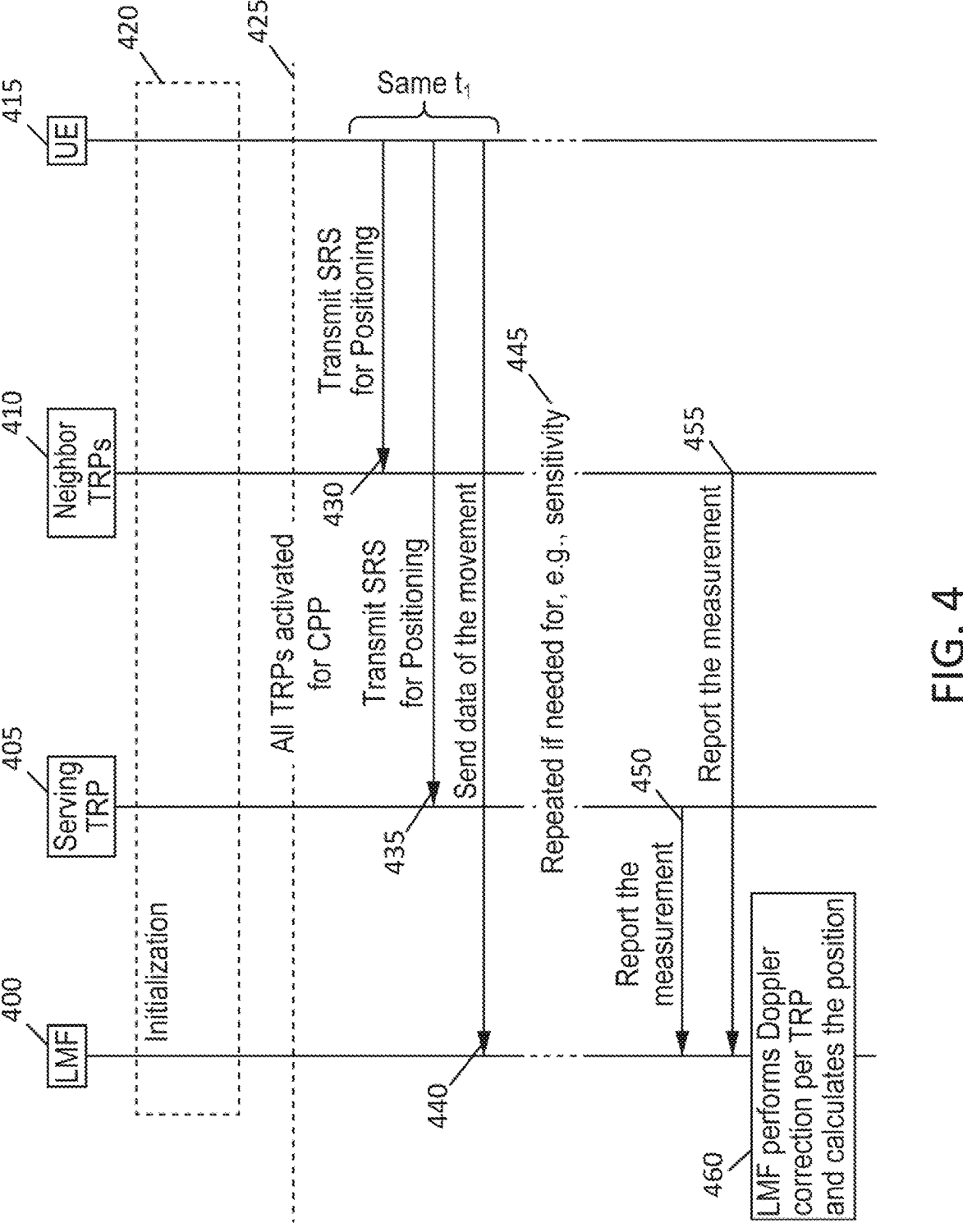
FIG. 4 illustrates an example signal diagram, according to certain example embodiments.

FIG. 4 illustrates an example signal diagram, according to certain example embodiments. In particular, FIG. 4 illustrates an example where the UE 415 may assist the LMF 400 by reporting the movement of the UE 415 at the time of transmitting the SRS when the UE 415 knows its movement (e.g., UE 415 knowing "where" and "how quickly" it is going; the UE 415 could report a vector of its movement). At 420, an initialization for communications takes place between the LMF 400, serving TRP 405, neighbor TRPs 410, and the UE 415. The neighbor TRPs 410 may correspond to the TRPs in neighbor cells (non-serving cells). At 425, all the TRPs 405, 410 are activated for CPP and can now perform CP measurements. At 430 and 435, the UE 415 transmits SRS for positioning to the neighbor TRPs 410 and the serving TRP 405. At 440, the UE 415 transmits data regarding its movement to the LMF 400. For instance, in some example embodiments, the UE may report the direction and the speed of its movement at the time of the SRS transmission. In some example embodiments, transmission of the SRS and the movement data may take place at the same time $t_1$. At 445, transmission of the SRS and the movement data may be repeated if needed (e.g., for sensitivity). At 450, the serving TRP 405 transmits a report of the measurement to the LMF 400, and, at 455, the neighbor TRPs also transmit a report of the measurement to the LMF 400. According to certain example embodiments, the report of the measurement (i.e., measurement report) may correspond to sending the CP measurements measured from the serving TRP/gNB 405 and the neighboring gNB/TRP 410. In certain example embodiments, for UL CP positioning, the UE may transmit SRSs, and the gNBs/TRPs may perform CP measurements from the SRSs. The gNBs may then provide the LMF with the obtained CP measurements. At 460, the LMF 400 performs a Doppler correction for each TRP 405, 410, and calculates the position of the UE 415 based on the measurement report. For instance, in certain example embodiments, in the case of UL, and when all the measurement reports are received, plus the corrections being completed, the LMF 400 may draw a curve from every TRP (the form of the curve may depend on many factors, but may be considered a circle as one example). The circle radius per TRP corresponds to the measured distance, and where all these circles cross, is the location of the UE.

As noted above, although the signal diagrams presented and described herein relate to UL direction, the same may be applicable for the DL direction as well. For instance, taking FIG. 3 as an example, the DL direction may correspond to a reversal of the arrows and changing the text to "Transmit PRS". The time indication (in FIG. 3: same $t_1$) may be moved in the signal diagram to the top of the figure, and all the TRPs may transmit at the same time (or at least within a "time window" as described in FIGS. 5 and 6 below).

Furthermore, to perform the DS correction, there may be equally in the DL case different options. Additionally, the UE 415 may be capable of performing the DS correction since it may know to run the frequency offset correction for a data signal. Thus, in certain example embodiments, a reference signal may be transmitted by the UE 415 to the TRPs 405, 410 for them to detect the DS.

Figure 5:
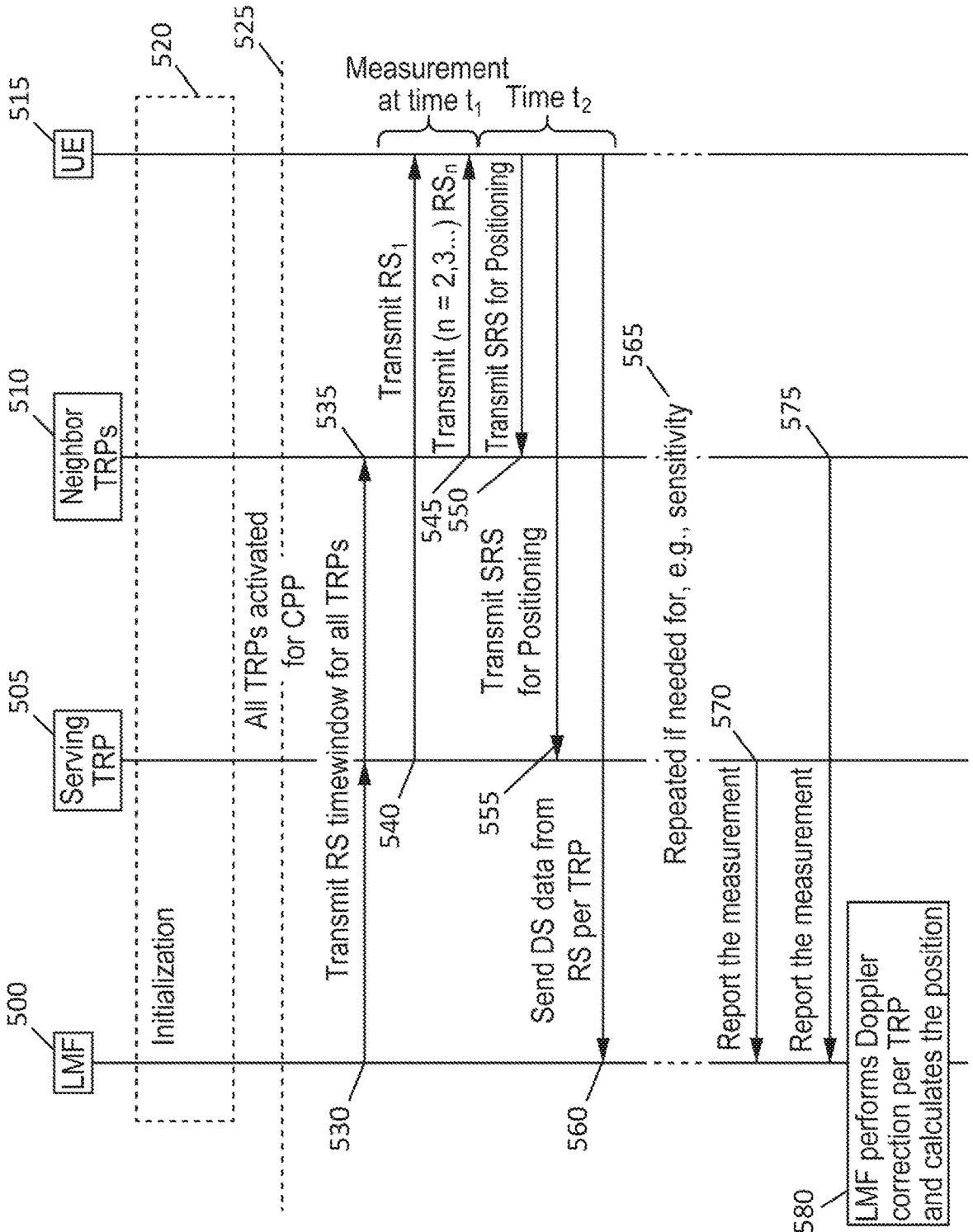
FIG. 5 illustrates an example of another signal diagram, according to certain example embodiments.

FIG. 5 illustrates an example of another signal diagram, according to certain example embodiments. In particular, FIG. 5 illustrates an example where the UE 515 assists the LMF 500 by reporting the movement of the UE at the time of transmitting the SRS when the UE knows only the RS derived DS per TRP (i.e., for each TRP). As illustrated in FIG. 5, the signal diagram defines a validity window, which represents a time domain window where the RS-based DS measurement by the UE 515 is valid for the SRS for positioning transmission. Although it may be desirable to perform the RS measurement at the same time as the SRS transmission, it is often not possible. Thus, the difference $t_1-t_2$ is less than the validity window. In certain example embodiments, there may be multiple types of validity windows, even for CPP.

At 520, an initialization for communications takes place between the LMF 500, serving TRP 505, neighbor TRPs 510, and the UE 515. At 525, all the TRPs 505, 510 are activated for CPP. At 530 and 535, the LMF 500 instructs every TRP 505, 510 to perform transmission of the RS within a specified time window. According to certain example embodiments, the validity time (e.g., time window) may be defined where the transmitted RS may be used to calculate the DS per TRP 505, 510. At 540, the serving TRP 505 transmits $RS_1$ to the UE 515. Similarly, at 545, the neighbor TRPs 510 transmits $RS_n$ to the UE 515, where n=2, 3, . . . , etc. According to certain example embodiments, the transmissions at 540 and 545 may be performed at time $t_1$ of the time domain window.

At 550, the UE 515 transmits the SRS signal for positioning to the neighbor TRPs, and at 555, the UE 515 transmits the SRS signal for positioning to the serving TRP 505. According to certain example embodiments, transmission of the SRS signals for positioning at 550 and 555 may be performed at time $t_2$ of the time domain window. At 560, the UE 515 reports the DS data from the RS per TRP, and sends the SRS per TRP within the validity time window. At 565, the UE 515 may repeat transmission of the report of the DS per TRP 560 if needed (e.g., for sensitivity), and SRS for positioning 555. At 570, the serving TRP reports the measurement to the LMF 500, and at 575, the neighbor TRPs 510 transmit a report of the measurement to the LMF 500. At 580, the LMF 500 performs a Doppler correction for each TRP 505, 510, and calculates the position of the UE 515 based on the measurement report (e.g., similar to the calculation at 460).

Figure 6:
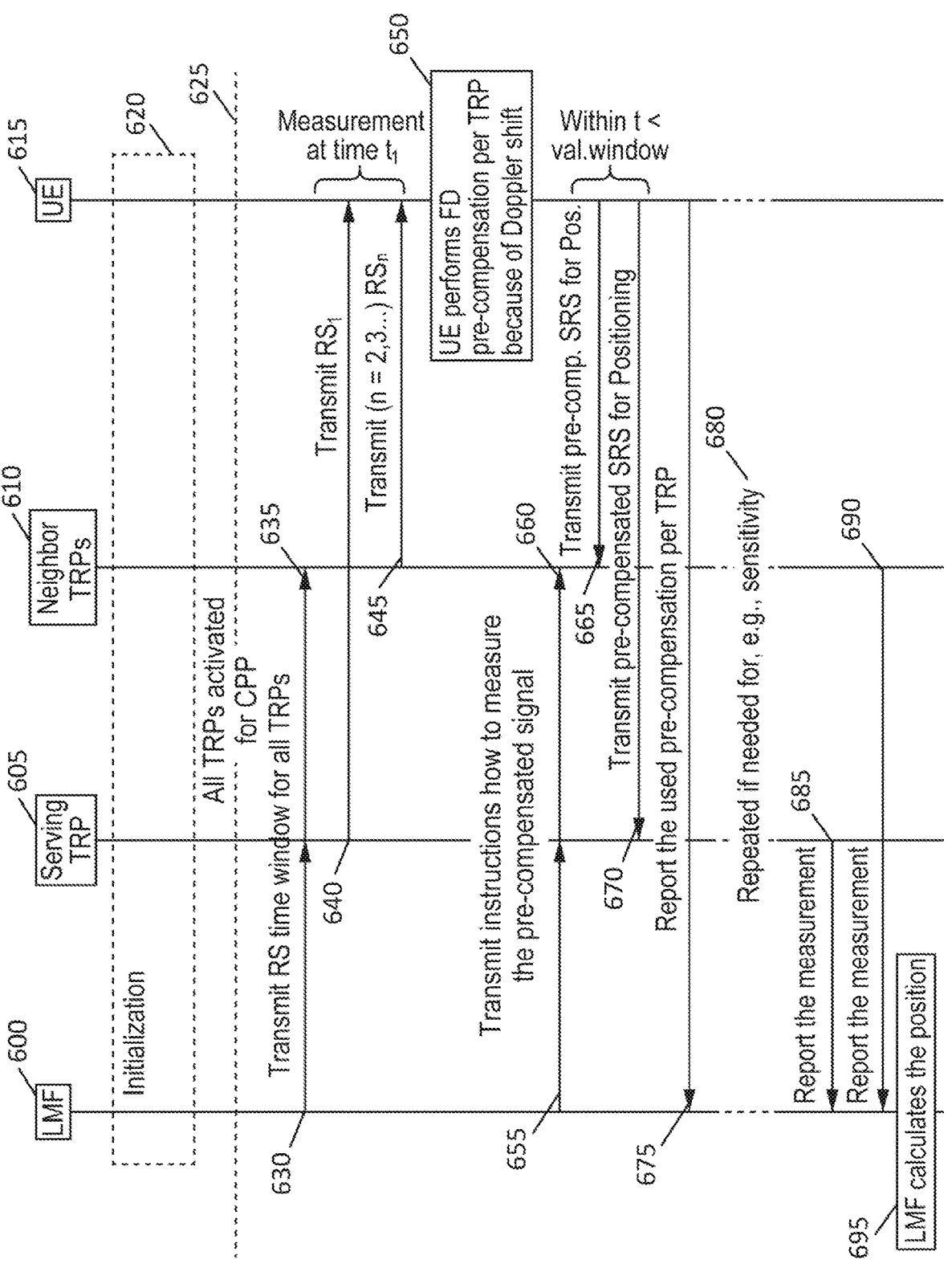
FIG. 6 illustrates an example of a further signal diagram, according to certain example embodiments.

FIG. 6 illustrates an example of a further signal diagram, according to certain example embodiments. In particular, FIG. 6 illustrates an example where the UE 615 pre-compensates the signal in the frequency-domain while transmitting SRS for positioning. At 620, an initialization for communications takes place between the LMF 600, serving TRP 605, neighbor TRPs 610, and the UE 615. At 625, all the TRPs 605, 610 are activated for CPP. At 630 and 635, the LMF 600 instructs every TRP 605, 610 to perform transmission of the RS within a specified time window. According to certain example embodiments, the validity time (e.g., time window) may be defined where the transmitted RS may be used to calculate the DS per TRP 605, 610. At 640, the serving TRP 605 transmits $RS_1$ to the UE 615. Similarly, at 645, the neighbor TRPs 610 transmit $RS_n$ to the UE 615, where n=2, 3, . . . , etc.

At 650, the UE 615 performs frequency-domain pre-compensation of the RS received from each TRP 605, 610 due to DS from movement of the UE 615. For example, compensation may be performed prior to the transmission of the SRS. In certain example embodiments, the pre-compensation may distort the RS in the opposite direction before the transmission, then during the propagation over the air, the signal may change because of the DS. However, if the pre-compensation is exactly the amount of the DS but with the opposite sign, they cancel each other out. At 655 and 660, the LMF 600 instructs the TRPs 605, 610 to correctly measure the pre-compensated signals. According to certain example embodiments, the RS signals received from the TRPs 605, 610 may be pre-compensated by the UE 615 via a primary compensation method using the frequency-domain, or a secondary compensation method by applying the phase-domain. For instance, in some example embodiments, since the DS is a frequency-domain phenomenon, the frequency may change. Thus, the primary corrective action may be in the frequency-domain. However, for practical reasons (i.e., the complexity of the implementation), the corrective action may not necessarily be done in the frequency-domain. The phase-domain may be used with certain limitations; the changed frequency may suggest that the phase measured is also impacted. For example, considering one single wavelength, the phase may be rotated 360 degrees. If the frequency is increased (by the DS) by 50%, the wavelength may be respectively decreased by 1/1.5=67%. As such, the phase has rotated over one full cycle for the same geometrical distance. In certain example embodiments, every SRS per TRP may have its own pre-compensation. This may lead to a situation where the transmission may be split in the time-domain to different time moments.

At 665 and 670, the UE 615 transmits a pre-compensated SRS for positioning to the neighbor TRPs 610 and the serving TRP 605. According to certain example embodiments, the pre-compensated SRS for positioning may be transmitted to the neighbor TRPs 610 and the serving TRP 605 within the defined time period window. At 675, the UE reports the used/applied pre-compensation per TRP to the LMF 600. According to certain example embodiments, the report at 675 may be sent to the LMF 600 for various purposes including, for example: that a method (e.g., the pre-compensation-if any pre-compensation is performed) is applied; whether the method is performed in the frequency-domain or the phase-domain; if it is the frequency-domain method, how compensation is performed; and if the method is in the phase-domain, how the compensation is performed. At 680, the UE 615 may repeat transmission of the report of the DS per TRP 675 if needed (e.g., for sensitivity) and the pre-compensated SRS 665, 670. At 685 and 690, the serving TRP and neighbor TRPs 610 transmits a report of the measurement to the LMF 600. At 695, the LMF 600 calculates the position of the UE 615 based on the report and used/applied pre-compensation per TRP. According to certain example embodiments, the LMF 600 may consider increased/decreased wavelength based on a decreased/increased number of propagation cycles and last fractional wavelength in over-the-air (OTA) if the serving TRP 605/neighbor TRPs 610 have properly corrected the measurement values.

Figure 7:
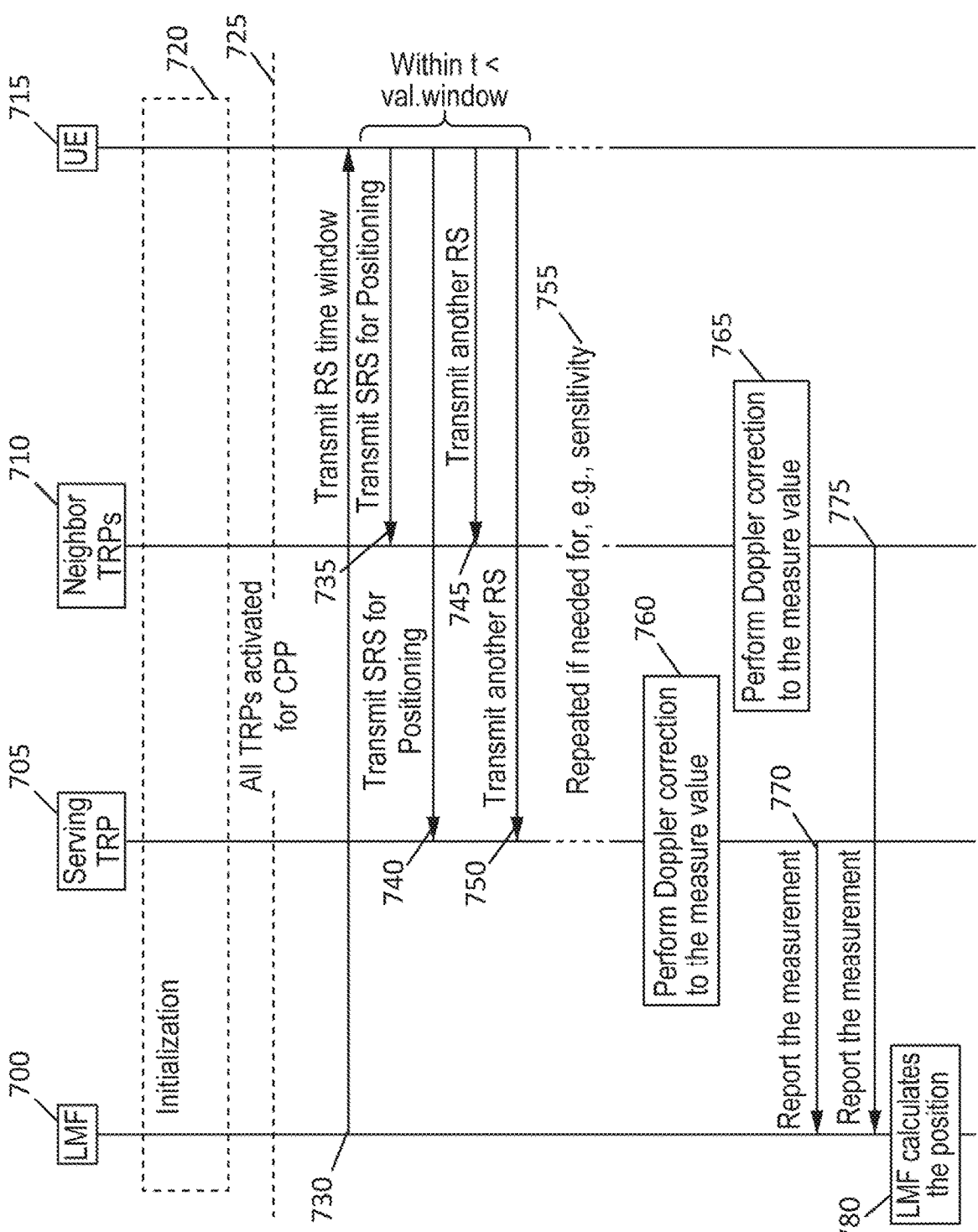
FIG. 7 illustrates an example of a further signal diagram, according to certain example embodiments.

FIG. 7 illustrates an example of a further signal diagram, according to certain example embodiments. In particular, FIG. 7 illustrates an example where the UE 715 transmits SRS without any assisting information from the other network entities, and transmits another RS for DS. At 720, an initialization for communications takes place between the LMF 700, serving TRP 705, neighbor TRPs 710, and the UE 715. At 725, all the TRPs 705, 710 are activated for CPP. At 730, the LMF 700 transmits a RS time window command to the UE 715 for transmission of SRS. In certain example embodiments, the RS time window command may couple two separate RSs to be transmitted close enough to each other. At 735 and 740, the UE 715 transmits SRS for positioning to the neighbor TRPs 710 and the serving TRP 705 within the time window. At 745, the UE 715 transmits a RS to the neighbor TRPs 710, and at 750, the UE 715 transmits another RS to the serving TRP 705 within the time window. At 755, the UE 715 may repeat transmission of the SRS and/or RS if needed (e.g., for sensitivity).

At 760 and 765, the serving TRP 705 and neighbor TRPs 710 perform a Doppler correction to the measured value. For instance, the receiver of the TRP may sense the amount of DS, and based on this, may perform a respective correction (e.g., cancelling the DS from the signal). At 770 and 775, the serving TRP 705 and neighbor TRPs 710 report the measurement to the LMF 700. At 780, the LMF 700 calculates the position of the UE 715 based on the measurement reports.

Figure 8:
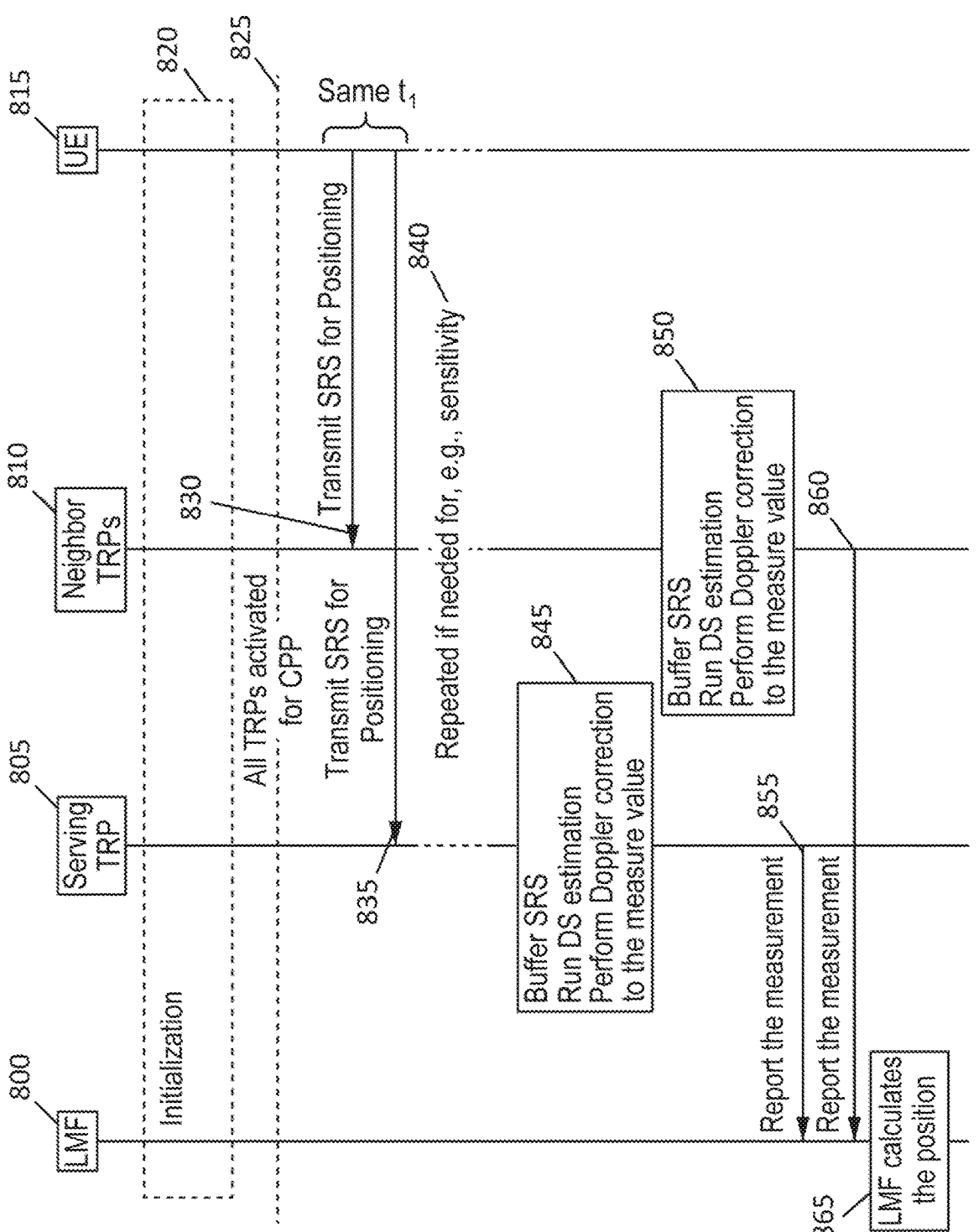
FIG. 8 illustrates an example of a further signal diagram, according to certain example embodiments.

FIG. 8 illustrates an example of a further signal diagram, according to certain example embodiments. In particular, FIG. 8 illustrates an example of where the UE 815 transmits SRS without any assisting information, and no RS is used for DS. At 820, an initialization for communications takes place between the LMF 800, serving TRP 805, neighbor TRPs 810, and the UE 815. At 825, all the TRPs 805, 810 are activated for CPP. At 830 and 835, the UE 815 transmits SRS for positioning to the neighbor TRPs 810 and the serving TRP 805 at the same time instance $t_1$. At 840, the UE 815 may repeat transmission of the SRS for positioning if needed (e.g., for sensitivity). At 845 and 850, the serving TRP 805 and neighbor TRPs 810 buffers the SRS received from 830 and 835. The serving TRP 805 and neighbor TRPs 810 may also run DS estimation based on the received SRS, and perform a Doppler correction to the measured value. At 855 and 860, the serving TRP 705 and the neighbor TRPs 810 transmits a report of the measurement to the LMF 800. At 865, the LMF 800 calculates the position of the UE 815 based on the received reports.

Figure 9:
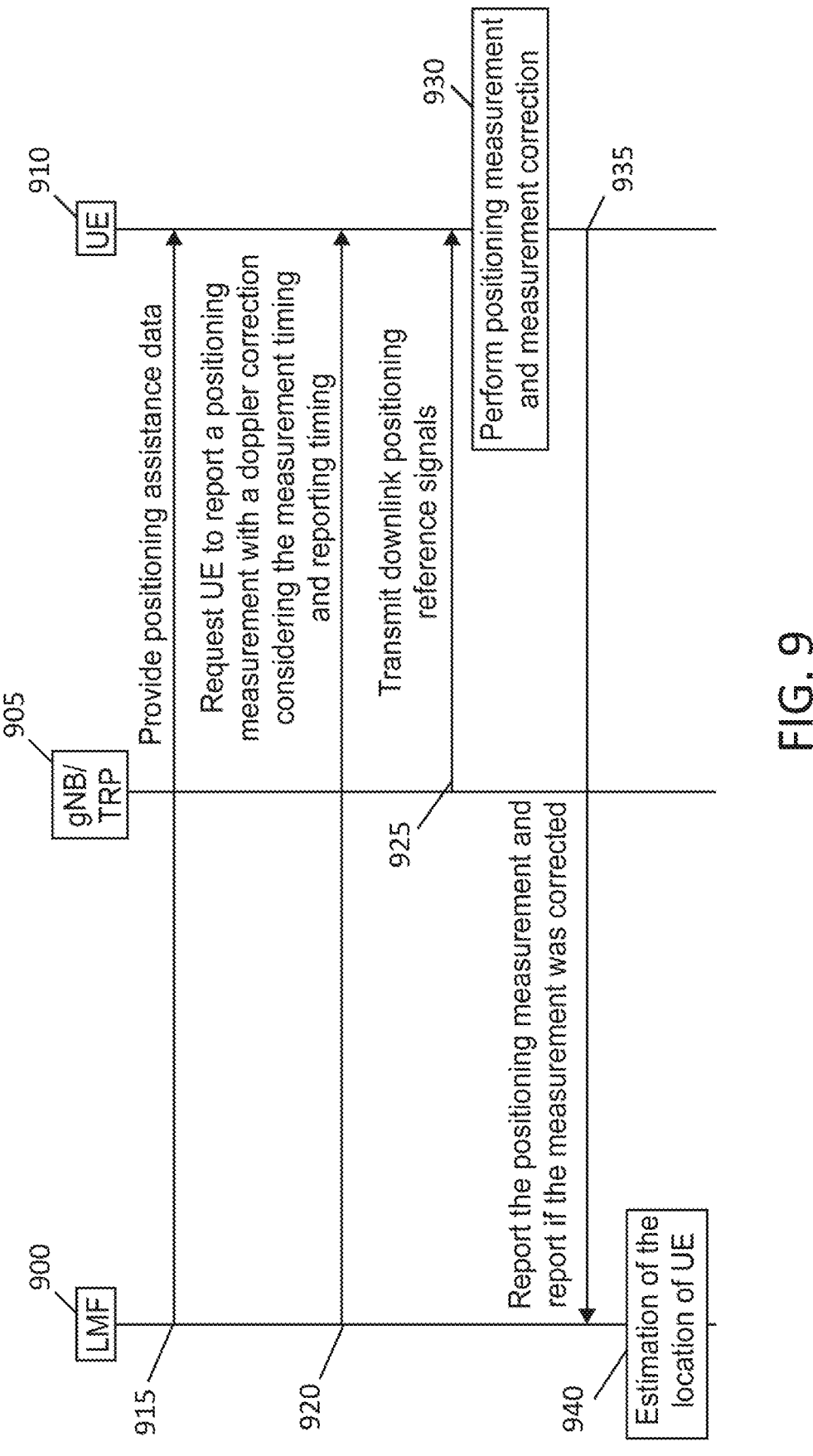
FIG. 9 illustrates an example of a further signal diagram, according to certain example embodiments.

FIG. 9 illustrates an example of a further signal diagram, according to certain example embodiments. In particular, FIG. 9 illustrates interactions between the LMF 900, gNB/TRP 905, and UE 910. At 915, the LMF 900 provides positioning assistance data to the UE 910 (e.g., similar to activating all the TRPs for CPP described in the example embodiments above). At 920, the LMF 900 requests the UE 910 to report a positioning measurement with a DS correction based on the timing to perform the CP measurement and the timing to report the obtained CP measurement. At 925, the gNB/TRP 905 transmits DL RSs to the UE 910. At 930, the UE 910 performs a positioning measurement and measurement correction (e.g., referring to CP measurements) based on the received DL positioning RSs. At 935, the UE 910 reports the positioning measurement to the LMF 900, and also reports to the LMF 900 whether the measurement was corrected. At 940, the LMF 900 estimates the location of the UE 910 based on the positioning measurement report and whether the measurement was corrected.

FIG. 10 illustrates an example flow diagram of a method, according to certain example embodiments. In an example embodiment, the method of FIG. 10 may be performed by a network entity, or a group of multiple network elements in a 3GPP system, such as LTE or 5G-NR. For instance, in an example embodiment, the method of FIG. 10 may be performed by a UE, similar to one of apparatuses 10 or 20 illustrated in FIG. 13.

As illustrated in FIG. 10, the method may include, at 1000, receiving an indication to transmit a sounding reference signal or a carrier phase positioning measurement. In certain example embodiments, the indication may include at least a phase pre-compensation on the sounding reference signal transmission or a correction of the carrier phase positioning measurement based at least on a Doppler shift. The method may also include, at 1005 performing, at a user equipment, the phase pre-compensation for the sounding reference signal transmission, or the correction of the carrier phase positioning measurement. The method may further include, at 1010, transmitting, by the user equipment, the sounding reference signal with the phase pre-compensation or the carrier phase positioning measurement.

According to certain example embodiments, the method may further include receiving a reference signal from a plurality of network elements at a first time period within a time window. According to some example embodiments, the method may also include determining Doppler shift data for the plurality of network elements based on the reference signal received at the first time period. According to other example embodiments, the method may further include transmitting the Doppler shift data for the plurality of network elements to another network element.

In certain example embodiments, the sounding reference signal may be transmitted to the plurality of network elements at a second time period within the time window. In some example embodiments, performing the phase pre-compensation may include applying a frequency-domain pre-compensation to the Doppler shift per network element of the plurality of network elements. In other example embodiments, the transmission of the sounding reference signal to the plurality of network elements may include the frequency-domain pre-compensation.

According to certain example embodiments, correction of the carrier phase positioning measurement may be performed at the user equipment based on the Doppler shift between a timing of performing the carrier phase positioning measurement, and a timing of reporting the carrier phase positioning measurement. According to some example embodiments, the method may also include receiving a transmit reference signal time window. According to other example embodiments, the sounding reference signal may be transmitted to the plurality of network elements within the reference signal time window. According to further example embodiments, the method may include receiving an indication to provide user equipment data to a location management function. According to some example embodiments, the user equipment data may include at least one of a movement data of the user equipment, Doppler shift of the user equipment, or movement data of the user equipment during the sounding reference signal transmission.

Figure 11:
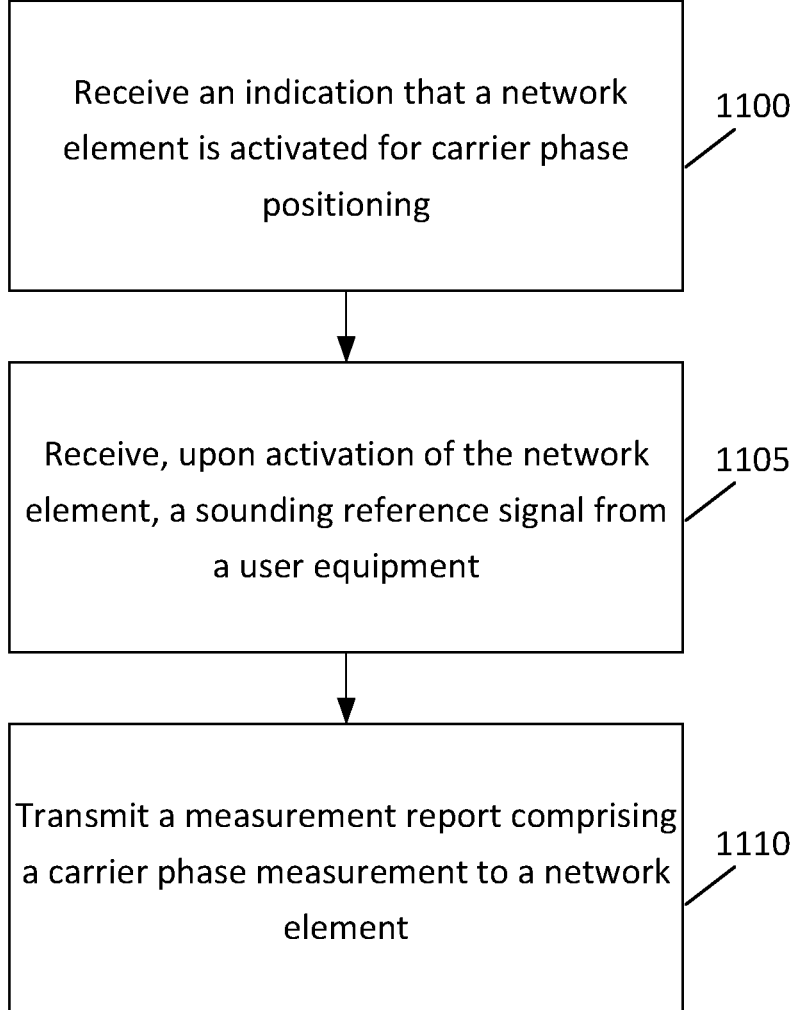
FIG. 11 illustrates an example flow diagram of another method, according to certain example embodiments.

FIG. 11 illustrates an example flow diagram of another method, according to certain example embodiments. In an example embodiment, the method of FIG. 11 may be performed by a network entity, or a group of multiple network elements in a 3GPP system, such as LTE or 5G-NR. For instance, in an example embodiment, the method of FIG. 11 may be performed by a BS, TRP, gNB, or network, similar to one of apparatuses 10 or 20 illustrated in FIG. 13.

As illustrated in FIG. 11, the method may include, at 1100, receiving an indication that a network element is activated for carrier phase positioning. The method may also include, at 1105, receiving, upon activation of the network element, a sounding reference signal from a user equipment. The method may further include, at 1110, transmitting a measurement report comprising a carrier phase measurement to a network element.

According to certain example embodiments, the method may further include transmitting a reference signal to the user equipment at a first time period within a time window. According to some example embodiments, the sounding reference signal many include a frequency-domain pre-compensation for a Doppler shift caused by movement of the user equipment. According to other example embodiments, the sounding reference signal may include a carrier phase measurement of a carrier phase, and the method may also include performing a Doppler correction of a Doppler shift of the carrier phase caused by movement of the user equipment. According to further example embodiments, the method may further include buffering the sounding reference signal, estimating a Doppler shift of the sounding reference signal, and performing a Doppler correction of a carrier phase in a carrier phase measured from the sounding reference signal.

Figure 12:
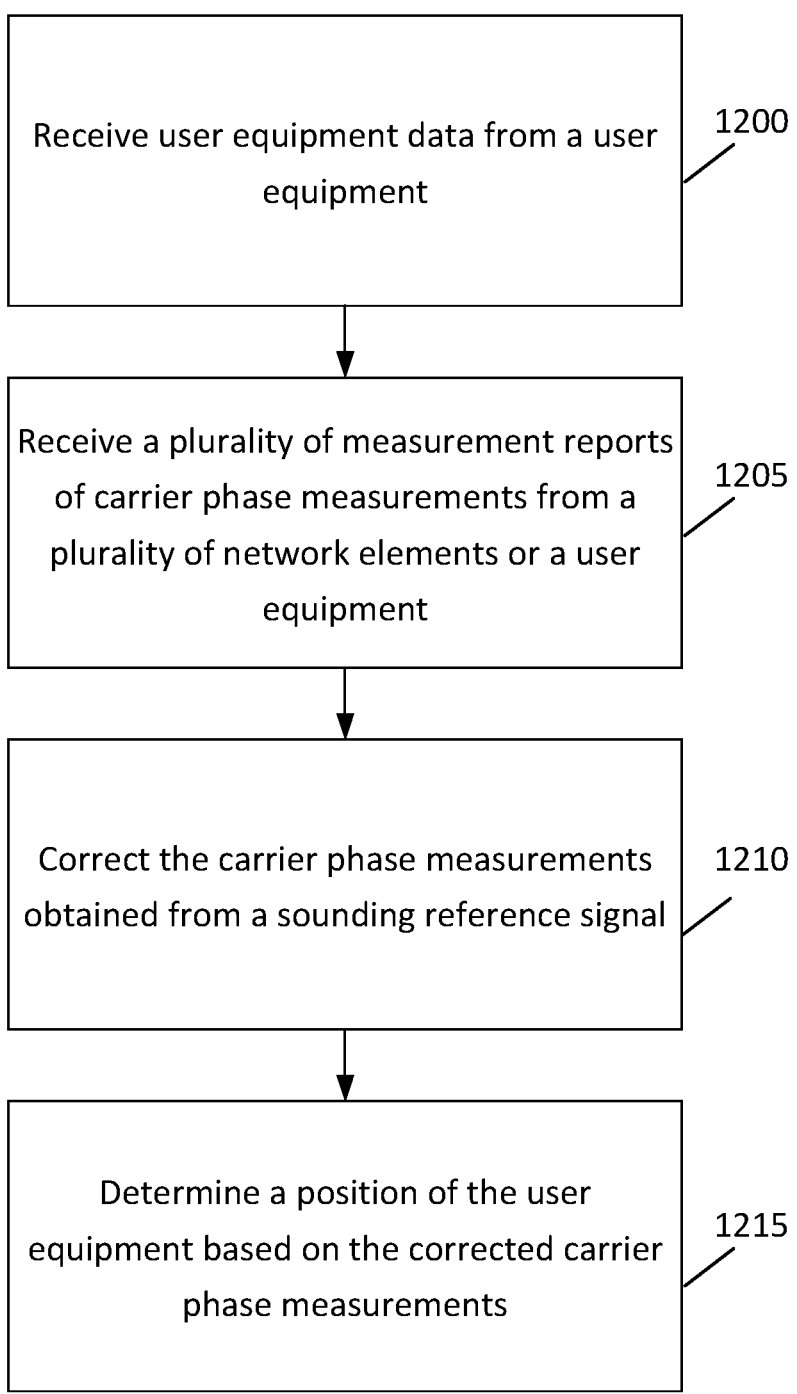
FIG. 12 illustrates an example flow diagram of a further method, according to certain example embodiments.

FIG. 12 illustrates an example flow diagram of a further method, according to certain example embodiments. In an example embodiment, the method of FIG. 12 may be performed by a network entity, or a group of multiple network elements in a 3GPP system, such as LTE or 5G-NR. For instance, in an example embodiment, the method of FIG. 12 may be performed by a LMF or network, similar to one of apparatuses 10 or 20 illustrated in FIG. 13.

As illustrated in FIG. 12, the method may include, at 1200, receiving user equipment data from a user equipment. The method may also include, at 1205, receiving a plurality of measurement reports of carrier phase measurements from a plurality of network elements or a user equipment. The method may further include, at 1210, correcting the carrier phase measurements obtained from a sounding reference signal. Further, the method may include, at 1215, determining a position of the user equipment based on the corrected carrier phase measurements.

According to certain example embodiments, the method may also include defining a reference signal time window for the plurality of network elements, and instructing the plurality of network elements to perform transmission of a reference signal within the time window. According to other example embodiments, the user equipment data may include movement data of the user equipment.

In certain example embodiments, the user equipment data may include Doppler shift data for the plurality of network elements. In other example embodiments, the method may further include receiving a report identifying an applied frequency-domain pre-compensation to a Doppler shift.

Figure 13:
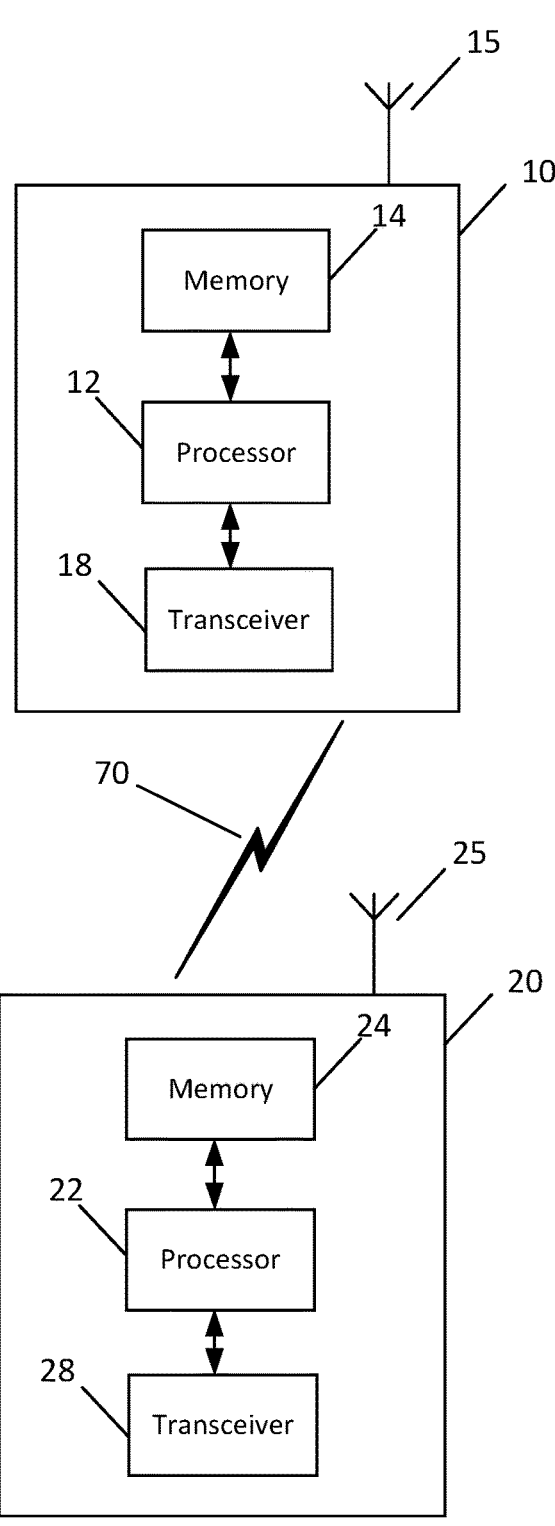
FIG. 13 illustrates a set of apparatuses, according to certain example embodiments.

FIG. 13 illustrates a set of apparatuses 10 and 20 according to certain example embodiments. In certain example embodiments, apparatuses 10 and 20 may be elements in a communications network or associated with such a network. For example, apparatus 10 may be a UE, or other similar radio communication computer device, and apparatus 20 may be a BS, gNB, TRP, LMF, network, or other similar computing device.

In some example embodiments, apparatuses 10 and 20 may include one or more processors, one or more computer-readable storage medium (for example, memory, storage, or the like), one or more radio access components (for example, a modem, a transceiver, or the like), and/or a user interface. In some example embodiments, apparatuses 10 and 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatuses 10 and 20 may include components or features not shown in FIG. 13.

As illustrated in the example of FIG. 13, apparatuses 10 and 20 may include or be coupled to a processor 12 and 22 for processing information and executing instructions or operations. Processors 12 and 22 may be any type of general or specific purpose processor. In fact, processors 12 and 22 may include one or more of general-purpose computers, special purpose computers, microprocessors, DSPs, field-programmable gate arrays (FPGAs), application-specific integrated circuits (ASICs), and processors based on a multi-core processor architecture, as examples. While a single processors 12 and 22 is shown in FIG. 13, multiple processors may be utilized according to other example embodiments. For example, it should be understood that, in certain example embodiments, apparatuses 10 and 20 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processors 12 and 22 may perform functions associated with the operation of apparatuses 10 and 20 including, as some examples, precoding of antenna gain/phase parameters, encoding and decoding of individual bits forming a communication message, formatting of information, and overall control of the apparatuses 10 and 20, including processes and examples illustrated in FIGS. 1-12.

Apparatuses 10 and 20 may further include or be coupled to a memories 14 and 24 (internal or external), which may be respectively coupled to processors 12 and 24 for storing information and instructions that may be executed by processors 12 and 24. Memories 14 and 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memories 14 and 24 can be comprised of any combination of random access memory (RAM), read only memory (ROM), static storage such as a magnetic or optical disk, hard disk drive (HDD), or any other type of non-transitory machine or computer readable media. The instructions stored in memories 14 and 24 may include program instructions or computer program code that, when executed by processors 12 and 22, enable the apparatuses 10 and 20 to perform tasks as described herein.

In certain example embodiments, apparatuses 10 and 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 12 and 22 and/or apparatuses 10 and 20 to perform any of the methods and examples illustrated in FIGS. 1-12.

In some example embodiments, apparatuses 10 and 20 may also include or be coupled to one or more antennas 15 and 25 for receiving a downlink signal and for transmitting via an UL from apparatuses 10 and 20. Apparatuses 10 and 20 may further include a transceivers 18 and 28 configured to transmit and receive information. The transceivers 18 and 28 may also include a radio interface (e.g., a modem) coupled to the antennas 15 and 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceivers 18 and 28 may be configured to modulate information on to a carrier waveform for transmission by the antennas 15 and 25 and demodulate information received via the antenna 15 and 25 for further processing by other elements of apparatuses 10 and 20. In other example embodiments, transceivers 18 and 28 may be capable of transmitting and receiving signals or data directly. Additionally or alternatively, in some example embodiments, apparatus 10 may include an input and/or output device (I/O device). In certain example embodiments, apparatuses 10 and 20 may further include a user interface, such as a graphical user interface or touchscreen.

In certain example embodiments, memories 14 and 34 store software modules that provide functionality when executed by processors 12 and 22. The modules may include, for example, an operating system that provides operating system functionality for apparatuses 10 and 20.

The memory may also store one or more functional modules, such as an application or program, to provide additional functionality for apparatuses 10 and 20. The components of apparatuses 10 and 20 may be implemented in hardware, or as any suitable combination of hardware and software. According to certain example embodiments, apparatuses 10 and 20 may optionally be configured to communicate each other (in any combination) via a wireless or wired communication links 70 according to any radio access technology, such as NR.

According to certain example embodiments, processors 12 and 22 and memories 14 and 24 may be included in or may form a part of processing circuitry or control circuitry. In addition, in some example embodiments, transceivers 18 and 28 may be included in or may form a part of transceiving circuitry.

For instance, in certain example embodiments, apparatus 10 may be controlled by memory 14 and processor 12 to receive an indication to transmit a sounding reference signal or a carrier phase positioning measurement. The indication may include at least a phase pre-compensation on the sounding reference signal transmission or a correction of the carrier phase positioning measurement based at least on a Doppler shift. Apparatus 10 may also be controlled by memory 14 and processor 12 to perform the phase pre-compensation for the sounding reference signal transmission, or the correction of the carrier phase positioning measurement. Apparatus 10 may further be controlled by memory 14 and processor 12 to transmit the sounding reference signal with the phase pre-compensation or the carrier phase positioning measurement.

In other example embodiments, apparatus 20 may be controlled by memory 24 and processor 22 to receive an indication that a network element is activated for carrier phase positioning. Apparatus 10 may also be controlled by memory 14 and processor 12 to receive, upon activation of the network element, a sounding reference signal from a user equipment. Apparatus 20 may further be controlled by memory 14 and processor 12 to transmit a measurement report comprising a carrier phase measurement to a network element.

In other example embodiments, apparatus 20 may be controlled by memory 24 and processor 22 to receive user equipment data from a user equipment. Apparatus 20 may also be controlled by memory 24 and processor 22 to receive a plurality of measurement reports of carrier phase measurements from a plurality of network elements or a user equipment. Apparatus 20 may further be controlled by memory 24 and processor 22 to correct the carrier phase measurements obtained from a sounding reference signal. Further, apparatus 20 may be controlled by memory 24 and processor 22 to determine a position of the user equipment based on the corrected carrier phase measurements.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving an indication to transmit a sounding reference signal or a carrier phase positioning measurement, wherein the indication comprises at least a phase pre-compensation on the sounding reference signal transmission or a correction of the carrier phase positioning measurement based at least on a Doppler shift. The apparatus may also include means for performing the phase pre-compensation for the sounding reference signal transmission, or the correction of the carrier phase positioning measurement. The apparatus may further include means for transmitting the sounding reference signal with the phase pre-compensation or the carrier phase positioning measurement.

Other example embodiments may be directed to an apparatus that includes means for performing any of the methods described herein including, for example, means for receiving an indication that a network element is activated for carrier phase positioning. The apparatus may also include means for receiving, upon activation of the network element, a sounding reference signal from a user equipment. The apparatus may further include means for transmitting a measurement report comprising a carrier phase measurement to a network element.

Other example embodiments may be directed to an apparatus that includes means for performing any of the methods described herein including, for example, means for receiving user equipment data from a user equipment. The apparatus may also include means for receiving a plurality of measurement reports of carrier phase measurements from a plurality of network elements or a user equipment. The apparatus may further include means for correcting the carrier phase measurements obtained from a sounding reference signal. In addition, the apparatus may include means for determining a position of the user equipment based on the corrected carrier phase measurements.

Certain example embodiments described herein provide several technical improvements, enhancements, and/or advantages. For instance, in some example embodiments, it may be possible to teach a system (e.g., the receiver) to properly read a measured signal, and how to operate post-processing to make the necessary corrections to obtain adequate location information regardless of the direction or speed of movement of the UE. In other example embodiments, it is possible to position a UE regardless of its stationarity. As such, it may be possible to improve customer satisfaction as customers may expect to be able to freely move while scanning their positions. In further example embodiments, since the users (e.g., UEs) move, they may not care about the stationarity requirement. As such, accuracy may be improved.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
5GS 5G System
BS Base Station
CPP Carrier-Phased Positioning
DL Downlink
DLx Downlink Transmission
DS Doppler Shift
eNB Enhanced Node B
E-UTRAN Evolved UTRAN
FD Frequency-Domain
FOC Frequency Offset Correction
gNB 5G or Next Generation NodeB
HAPS High Altitude Platform Stations
LMF Location Management Function
LPP LTE Positioning Protocol
LTE Long Term Evolution
NR New Radio
NTN Non-Terrestrial Network
OTA Over-the-Air
PD Phase-Domain PFL Positioning Frequency Layer
PRS Positioning Reference Signal
PRU Positioning Reference Unit
RS Reference Signal
RTT Round Trip Time
SRS Sounding Reference Signal
TRP Transmission Reception Point
UAV Unmanned Aerial Vehicle
UE User Equipment
UL Uplink
ULx Uplink Transmission

We claim:

1. A user equipment (UE) apparatus, comprising:
at least one processor; and
at least one memory storing instructions, wherein the instructions, when executed by the at least one processor, cause the apparatus at least to
receive an indication to transmit a sounding reference signal or a carrier phase positioning measurement, wherein the indication comprises at least a phase pre-compensation on the sounding reference signal transmission or a correction of the carrier phase positioning measurement based at least on a Doppler shift;
perform the phase pre-compensation for the sounding reference signal transmission, or the correction of the carrier phase positioning measurement;
transmit the sounding reference signal with the phase pre-compensation or the carrier phase positioning measurement, wherein performing the phase pre-compensation comprises applying a frequency-domain pre-compensation to the Doppler shift per network element of the plurality of network elements, and wherein the transmission of the sounding reference signal to the plurality of network elements comprises the frequency-domain pre-compensation;
receive a reference signal from a plurality of network elements at a first time period within a time window;
determine Doppler shift data for the plurality of network elements based on the reference signal received at the first time period; and
transmit the Doppler shift data for the plurality of network elements to another network element, wherein the sounding reference signal is transmitted to the plurality of network elements at a second time period within the time window;
transmit, to a location management function, a report indicating whether the phase pre-compensation is performed in a frequency-domain or a phase-domain; and
receive an indication to provide user equipment data to a location management function, wherein the user equipment data comprises a movement data of the apparatus, Doppler shift of the apparatus, and movement data of the apparatus during the sounding reference signal transmission.

* * * * *